United States Patent [19]

Dannenhauer et al.

[11] Patent Number: 5,770,299

[45] Date of Patent: Jun. 23, 1998

[54] MARKING FOR OBJECTS PAINTED WITH AN EFFECT PAINT AND PROCESS FOR PRODUCING THE MARKING

[75] Inventors: Fritz Dannenhauer, Hasel; Karl Holdik, Ulm, both of Germany

[73] Assignee: Mercedes-Benz AG, Stuttgart, Germany

[21] Appl. No.: 743,223

[22] Filed: Nov. 5, 1996

[30] Foreign Application Priority Data

Nov. 5, 1995 [DE] Germany .................. 195 41 028.9

[51] Int. Cl.$^6$ ........................................... B32B 9/00
[52] U.S. Cl. .................... 428/195; 428/31; 428/35.7; 428/203; 428/204; 428/207; 428/425.8; 427/137; 427/409; 106/266; 106/493; 106/499; 106/500
[58] Field of Search ................... 428/204, 203, 428/195, 35.7, 31, 425.8, 207; 427/137, 409; 106/493, 266, 499, 500, 494

[56] References Cited

U.S. PATENT DOCUMENTS 5,211,877   5/1993   Andrejewski et al. ........... 252/299.01
5,362,315   11/1994  Müller-Rees et al. .................. 106/493

FOREIGN PATENT DOCUMENTS 0 358 208   3/1990   European Pat. Off. .
0 649 124   4/1995   European Pat. Off. .
42 40 743   6/1994   Germany .
43 35 308   4/1995   Germany .

*Primary Examiner*—Patrick Ryan
*Assistant Examiner*—Abraham Bahta
*Attorney, Agent, or Firm*—Evenson, McKeown, Edwards & Lenahan, P.L.L.C.

[57] ABSTRACT

The invention relates to an effect paint for objects to be painted, as well as to a process for making the effect paint, wherein the effect paint comprises pigments. The pigments, produced by fragmenting a wiped and cross-linked film, are added to a starting paint of a paint coat of the object and result in color effect which depends on the viewing angle, and are also provided with a marking used to recognize and characterize the object.

9 Claims, 3 Drawing Sheets

MARKING FOR OBJECTS PAINTED WITH AN EFFECT PAINT AND PROCESS FOR PRODUCING THE MARKING

BACKGROUND AND SUMMARY OF THE INVENTION

The present invention relates to a marking for objects painted with an effect paint which contains pigments, wherein the pigments are produced by fragmenting a wiped and cross-linked film and are added to at least one starting paint of a paint coat of the object, to result in a color effect which depends on the viewing angle. The present invention also relates to a process for marking objects to be painted with an effect paint, in which a liquid-crystalline polymer film is wiped onto a smooth base and cross-linked, the film is subsequently detached from the base and fragmented to form pigments which have a color effect depending on the viewing angle, and the pigments are added to a starting paint of the paint coat.

U.S. Pat. No. 5,362,315 (counterpart of Published German Patent Application DE 42 40 743 A1) discloses a process for producing pigments which result in a color effect dependent on the viewing angle. However, this document does not disclose the marking of vehicles with such a paint coat.

Published German Patent Application DE 43 35 308 A1 (counterpart of U.S. application Ser. No. 08/324,476, filed Oct. 17, 1994) discloses a marking for vehicles, wherein pigments are arranged in a multi-layer paint coat. Marking is accomplished by applying a code which is either applied to the pigments and/or formed by the pigments themselves. However, according to this method, the application of such a coding to the pigments is costly.

It is an object of the present invention to develop a marking for objects utilizing an effect paint coat such that the marking of the object is simplified. It is also an object of the present invention to provide a process for marking the object.

One of the objects of the present invention is achieved by providing an effect paint comprising pigments which carry a marking which is recognized and which characterizes the object so marked. A further object of the present invention is achieved by a process for painting an object with an effect paint comprising pigments which are provided with a marking having a code, which thereby marks the painted object. As a result of the coding of the pigments which occurs during production, it becomes possible to apply a vehicle-specific marking with a paint coat in a simple manner during production of the pigments. Furthermore, it is possible, as a result of the pigmentation, to provide paint with the correct marking for re-painting or touchup painting.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
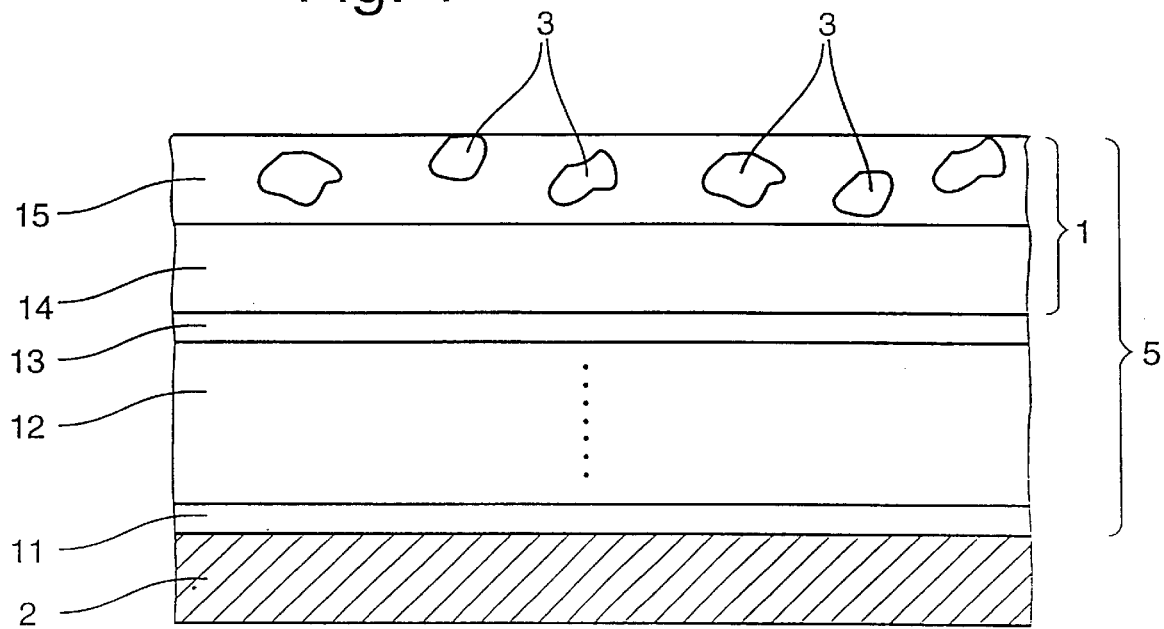
FIG. 1 is a cross-section of a paint coat of an object.

FIG. 1 is a cross-section of a paint coat 5 of an object 2, preferably a body panel of a motor vehicle body, with an effect paint coat 5. The effect paint coat 5 has a multi-layer structure comprising a plurality of flat layers arranged one above the another. The layered structure of the paint coat 5 on the object 2 comprises a phosphatizing layer 11, a primer layer 12, a filler layer 13, a toner layer 14 and an exterior paint layer 15. Paint layer 15 may optionally also be covered with another paint layer, preferably with a transparent coating, so that the pigments which are arranged in the paint layer 15 cannot protrude from surface of paint coat 5.

The outer paint layer 15, which is formed of a clear coating and is provided with effect pigment particles 3, and the toner layer 14 form the effect paint coat 1. Essentially, the effect is based on the fact that the pigment particles 3 are produced from a polymer which has a liquid-crystalline structure with a chiral nematic phase. U.S. Pat. No. 5,362,315 describes such pigments as well as a process for producing these pigments.

However, according to the present invention, the pigment particles 3 are provided not only for the so-called "color change or color flop effect" in which case the color impression of the paint coat 5 changes as a function of the viewing angle, but also as a carrier for a marking. The terminology "carrier for a marking" should also be understood figuratively, as indicated in the statements concerning FIGS. 4, 5 and 6, in which, among other things, a spectral segment of an electromagnetic spectrum 6 of the paint coat 5 is used for the marking.

The marking can be achieved in one of the ways described below and illustrated in FIGS. 3 to 7, whereby a combination of methods may possibly be advantageous.

Figure 2:
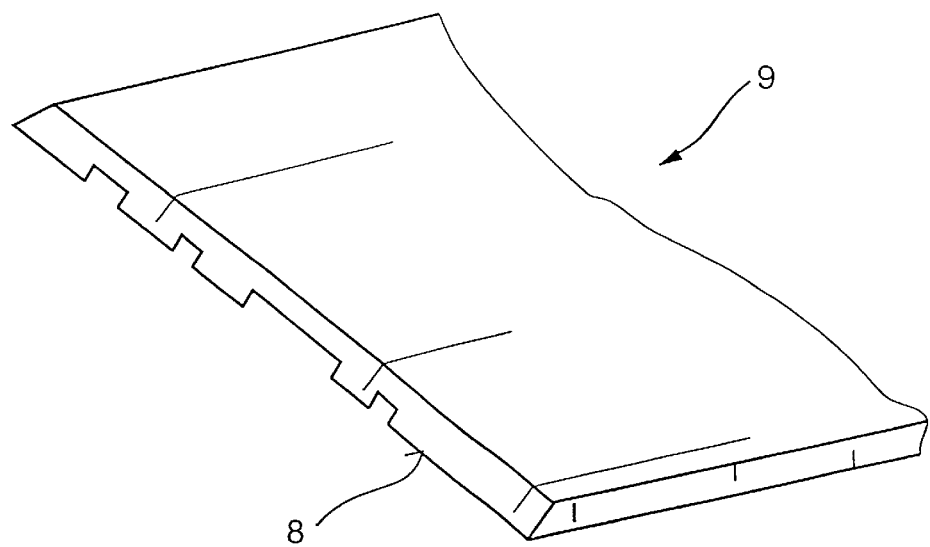
FIG. 2 is an enlarged view representing the blade of a wiping knife.
Figure 3:
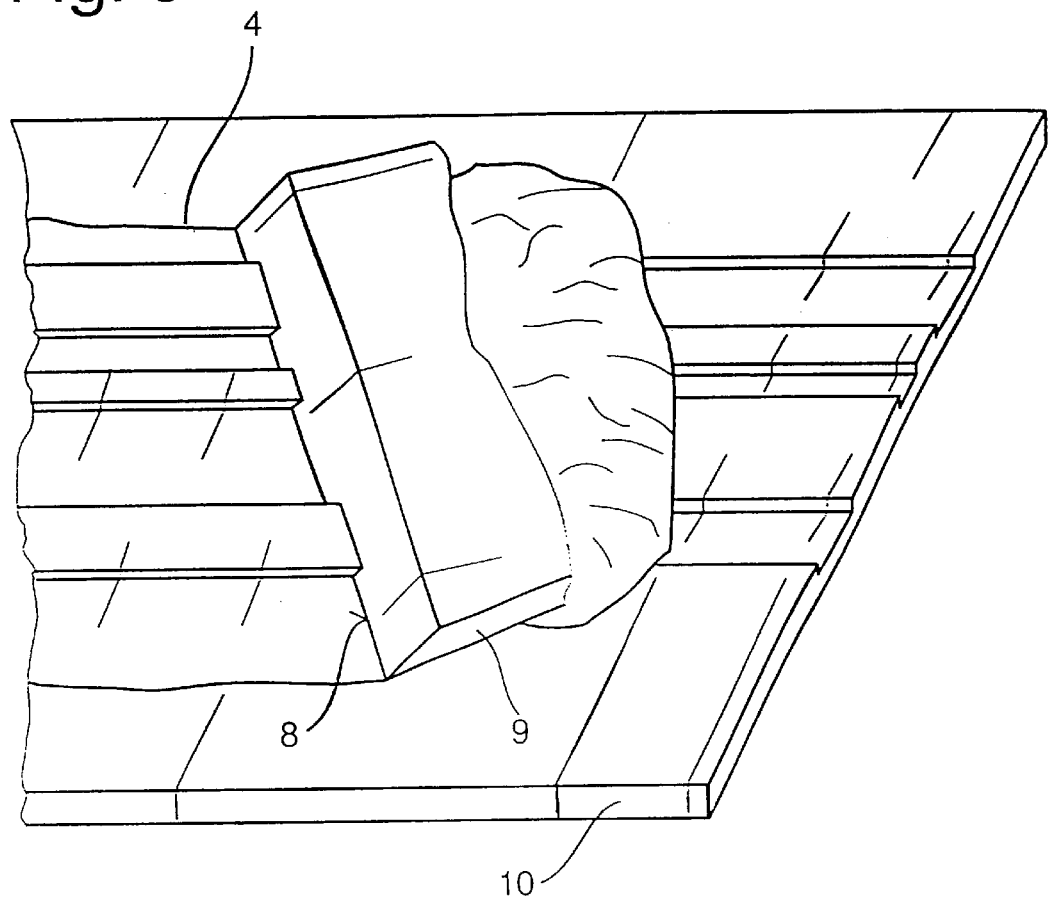
FIG. 3 is a view representing the wiping of a polymer film.

FIG. 2 illustrates a blade 8 of a wiping knife 9 used for making the pigment particles 3 which are provided with the marking. As illustrated in FIG. 3, the wiping knife 9 is used for applying a thin, wiped, cross-linking polymer film 4 on a base 10. The polymer film 4 is preferably broken up into particles several $\mu$m in size, preferably between 10 and 50 $\mu$m. The resulting particles become the effect pigments which are a component of the effect paint coat 1.

In order to produce the marking, the wiping knife 9 has a fluting which corresponds to the negative surface structure of a marking code. As a result, the code can be applied during the wiping of the film 4, as the blade 8 of the wiping knife 9 evens out the film 4. The film 4 or the pigment particles 3 preferably are marked with a pattern which is similar to that of a bar code.

As illustrated in FIG. 3, in another preferred embodiment, it is also advantageous to provide the base 10, onto which the film 4 is wiped, with a surface structure because then the two flat sides of the film 4, and therefore also the flat sides of the pigment particles 3, are provided with a marking code.

In this case, the codes on the two flat sides of film 4 may correspond to one another or differ from one another. In the latter case, the total number of markings which can be applied increases.

Figure 4:
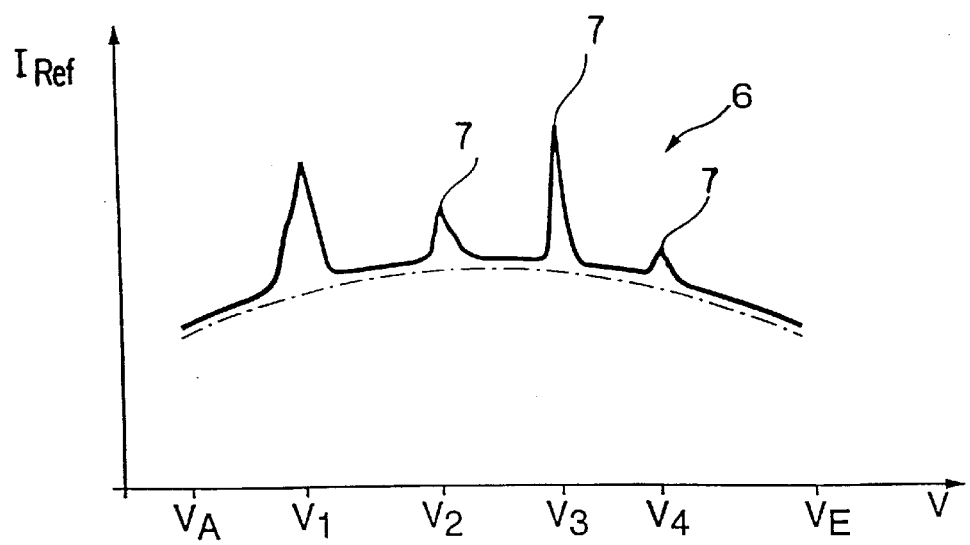
FIG. 4 represents a spectral segment of an electromagnetic spectrum falling in a range which exhibits luminescence.
Figure 5:
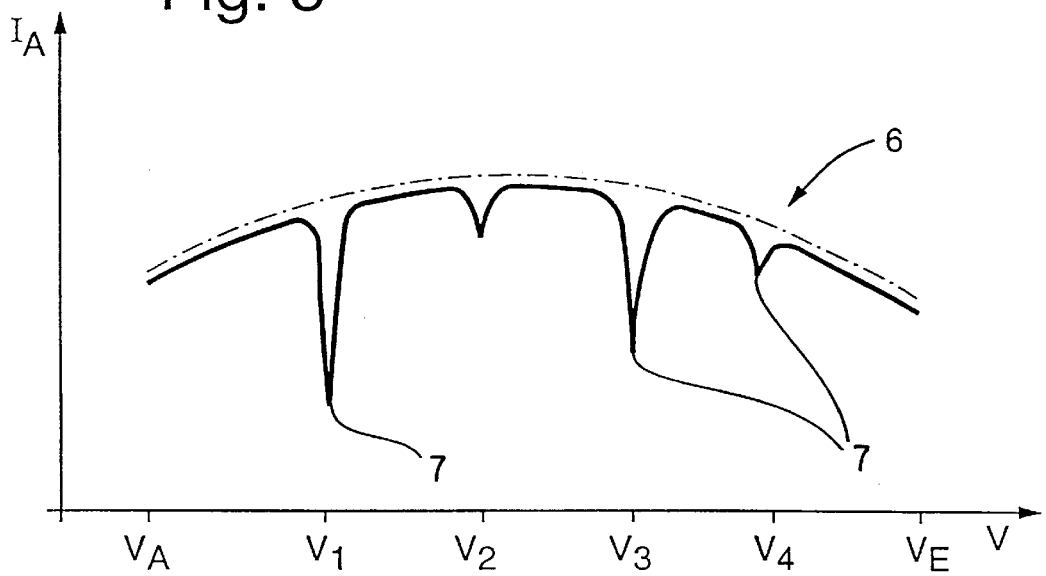
FIG. 5 represents a spectral segment of an electromagnetic spectrum falling in a range which exhibits absorption.

FIGS. 4 and 5 show a marking which results from a spectral segment of an electromagnetic spectrum 6 of the pigment particles 3 which falls within a predetermined measuring range.

In FIG. 4, the spectral segment 6 of the electromagnetic spectrum of the pigment particles 3 is manipulated such that, within the predetermined measuring range which is arranged between the frequency limits $V_A$ and $V_E$, the spectrum has a largely constant electromagnetic spectral segment 6 which, at certain frequencies $V_1$, $V_2$, $V_3$ and $V_4$ exhibits narrow-band extremes 7 exhibiting at least a 5% relative intensity change.

In FIG. 4, the marking is introduced by adding substances to the cross-linking polymer which are used to make film 4, which are luminescent in the viewed spectral segment 6.

In particular, such substances may comprise semiconductor crystals, as well as higher-element semiconductor crystals, such as II-VI semiconductor crystals, such as CdS and/or III-V semiconductor crystals, such as for example, GaAs, InP, InGaAs, etc.

Preferably, the specific frequencies $V_1$, $V_2$, $V_3$ and $V_4$ of the partial spectrum 6 are arranged outside the visible spectral range and in this case preferably in a spectral range in which the residual components of the paint coat 5 have low optical activity. As a result, these residual components of the paint coat 5 even in a worst case interfere very little with the spectral segment 6 containing the marking.

As illustrated in FIG. 4, the spectral segment 6 is arranged between the frequency limits $V_A$ (starting frequency) and $V_E$ (end frequency). The different intensity maxima of the extremes 7 are situated at the characterizing frequencies $V_1$, $V_2$, $V_3$ and $V_4$ which form the marking of the object 2.

Since the extremes 7 are introduced by crystals, the individual extremes 7 have a half-width which corresponds to those of the crystals. Therefore, the half-widths generally are only a few meV, whereby a plurality of characterizing frequencies are permitted.

Since, the intensity of these extremes 7 is additionally correlated to the concentration of the substances used, the relative intensities of the extremes 7 also can be used for marking, whereby the number of possible marking combinations will easily be more than a million.

In FIG. 5, the electromagnetic spectrum of the pigment particles 3 is manipulated such that, within a predetermined measuring range arranged between the frequency limits $V_A$ and $V_E$, the spectrum has a largely constant electromagnetic spectral segment 6 which, at specific characterizing frequencies $V_1$, $V_2$, $V_3$ and $V_4$, exhibits narrow-band extremes 7 with at least a 5% relative intensity change.

In FIG. 5, the markings are introduced by moving a laser along the film 4 from which the pigment particles 3 are produced, thereby eliminating the characterizing frequencies $V_1$, $V_2$, $V_3$ and $V_4$ from the spectral segment 6 of the electromagnetic spectrum of the pigment particles 3.

The specific frequencies $V_1$, $V_2$, $V_3$ and $V_4$ are preferably arranged outside the visible spectral range, and particularly in a spectral range in which the residual components of the paint coat 5 have low optical activity. As a result, these residual components of the paint coat 5 in the worst case only interfere very slightly with the marked spectral segment 6.

As illustrated in FIG. 5, the spectral segment 6 is arranged between the frequency limits $V_A$ (starting frequency) and $V_E$ (end frequency). The different intensity breaks of the extremes 7 are situated at the characterizing frequencies $V_1$, $V_2$, $V_3$ and $V_4$ which form the marking of the object 2.

Since the extremes 7 are advantageously generated by radiation with a semiconductor laser, the individual extremes 7 have a half width which is less than 10 Angstroms and particularly less than 1 Angstrom. As a result, the possible number of different individual markings available in this embodiment also is very high.

Figure 6:
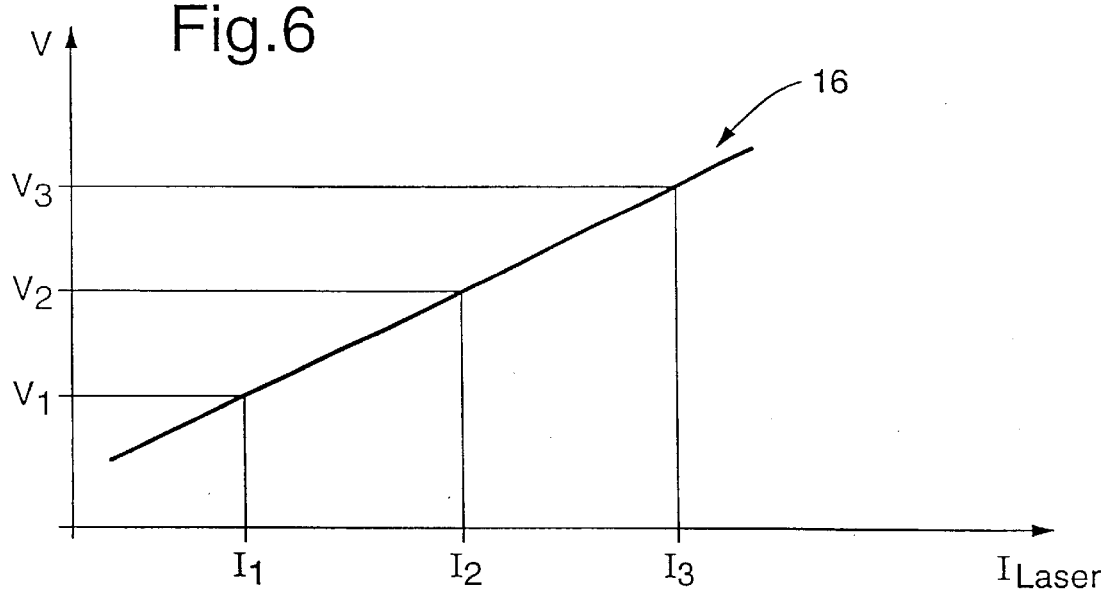
FIG. 6 represents a calibration curve for coloration of a polymer with a laser.

FIG. 6 illustrates a calibration curve 16 by which the pigment particles 3 are provided with a color marking. In this case, the color marking is not limited to the visible spectrum. Since the pigments 3 are made of a liquid-crystalline substance with a chiral phase, they can be provided with thin color stripes which are caused by the laser light and correspond approximately to the focus of the laser light. In this case, the fact that the inherent color of the pigment particles 3 at the frequencies $V_1$, $V_2$ and $V_3$ changes as a function of the beam intensity $I_1$, $I_2$ or $I_3$ of the laser light, is utilized. Thus, if film 4 is locally radiated by a laser light of different intensity, it is possible to provide pigment particles 3 with a color code similar to that of a bar code.

Figure 7:
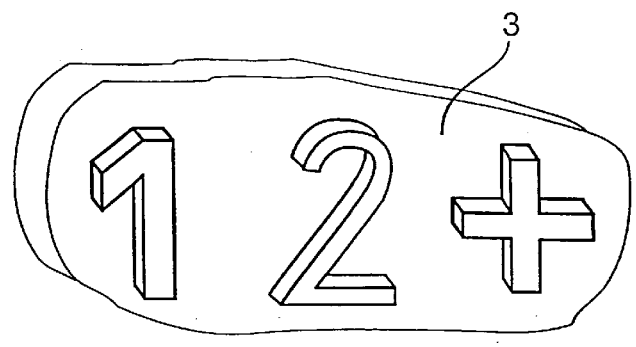
FIG. 7 is a cutout of a microstructured surface of a pigment.

FIG. 7 illustrates the direct marking of individual pigment particles 3 with a microstructured surface. In this case, the film 4 is lithographically provided with a pattern which forms the marking. In FIG. 7, the marking is the number twelve with a plus sign.

On the other hand, the wiped film 4 can also be indirectly provided with a structure by this method, wherein before wiping film 4, the base 10 and/or the wiping knife 9 are structured in a characterizing manner in the fashion of a matrix by synchrotron radiation lithography. Furthermore, it is also possible to introduce the marking with a die (not shown) which has previously been structured by synchrotron radiation lithography and then impressed in a male-mold-type manner into the film 4 and/or into the pigment particles 3.

Since structures smaller than 1 $\mu$m in size can be produced in polymers by synchrotron radiation lithography, film 4 can be structured such that the pattern representing the marking is smaller than the average pigment size.

For microscopic evaluation or recognition of the marking, it is useful for the surface structure of a pigment particles 3 produced by synchrotron radiation lithography to have a line thickness of at least 0.5 $\mu$m.

Another marking possibility is to combine the above-mentioned spectral phenomena with one another and/or with markings of the surface structure.

In the case of a purely electromagnetic consideration, markings based on the electromagnetic spectrum can have local absorption minima as well as local luminescence maxima.

Furthermore, such spectral marking can also be combined with topographical marking of the pigments, such as with a surface structure forming a bar code.

Depending on the type of marking, the marking can be tested spectroscopically and/or microscopically in an interference-free manner.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A pigment-containing effect paint for painting an object, said pigment imparting a color effect to the paint which depends on the viewing angle and comprising pigment particles formed by fracturing a wiped and cross-linked polymer film, said pigment particles comprising marked pigment particles which carry a recognizable marking which enables the object painted with the pigment-containing effect paint to be identified.

2. The paint according to claim 1, wherein the pigment particles have a liquid-crystalline structure with a chiral phase.

3. The paint according to claim 1, wherein the marked pigment particles comprise a surface structure which comprises the recognizable marking.

4. The paint according to claim 3, wherein the surface structure comprises a striped structure pattern similar to a bar code.

5. The paint according to claim 3, wherein the pigment particles are arranged in an outer transparent coating of the painted object.

6. The paint according to claim 3, wherein said surface structure is produced by synchrotron radiation lithography and has a line thickness larger than 0.5 µm.

7. The paint according to claim 1, wherein said recognizable marking comprises a spectral segment of an absorption spectrum, a luminescence spectrum, or a combination absorption and luminescence spectrum, wherein at predetermined wavelengths the spectral segment exhibits extremes at which an electromagnetic wave displays a relative intensity change of at least 5%.

8. The paint according to claim 1, wherein the marked pigment particles comprise a color pattern which comprises the recognizable marking.

9. A motor vehicle painted with the effect paint according to claim 1.

* * * * *